United States Patent

[11] 3,588,464

| [72] | Inventors | John F. Saenger, Jr.<br>Springfield;<br>Allan Enis, Scotch Plains; Harry C.<br>McGinty, Bellville, N.J. |
|---|---|---|
| [21] | Appl. No. | 816,998 |
| [22] | Filed | Apr. 17, 1969 |
| [45] | Patented | June 28, 1971 |
| [73] | Assignee | Union Carbide Corporation<br>New York, N.Y. |

[54] DUAL ELECTRODE TORCH FOR MANUAL WELDING
7 Claims, 2 Drawing Figs.

[52] U.S. Cl. .................................... 219/130, 219/75
[51] Int. Cl. .................................... B23k 9/00
[50] Field of Search .................................... 219/130, 75, 74, 136; 313/(Inquired)

[56] References Cited
UNITED STATES PATENTS

| 1,946,306 | 1/1934 | Catlett | 219/75 |
| 2,778,099 | 1/1957 | Anderson et al. | 219/130X |
| 2,906,854 | 9/1959 | Hill et al. | 219/75 |
| 3,122,629 | 2/1964 | Manz | 219/130X |
| 3,197,605 | 7/1965 | Sunnen | 219/75X |
| 3,265,856 | 8/1966 | Cecil | 219/130 |

Primary Examiner—J. V. Truhe
Assistant Examiner—George A. Montanye
Attorneys—Paul A. Rose, Thomas I. O'Brien, Dominic J. Terminello and Eugene Lieberstein ABSTRACT: A gas shielded arc welding torch for manual welding which houses both an auxiliary consumable electrode and a main nonconsumable electrode each operable independent of one another and wherein the position of the auxiliary electrode may be selectively adjusted with respect to the main electrode. The auxiliary electrode is carried by the gas nozzle which is rotatable about its longitudinal axis and which transmits power to the auxiliary electrode. The cooling fluid for the main electrode housing is recirculated to cool the nozzle and power line for the auxiliary electrode.

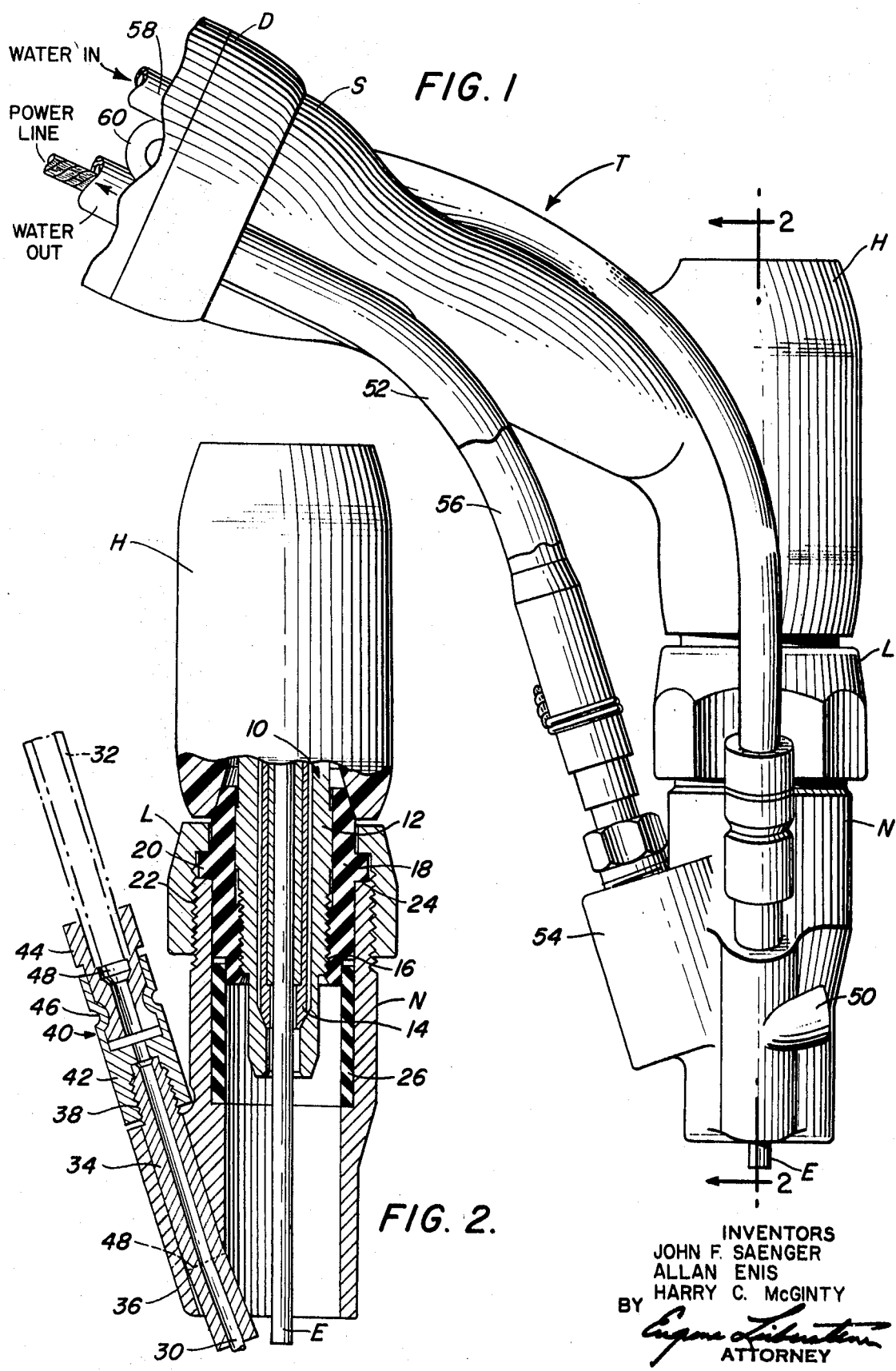

DUAL ELECTRODE TORCH FOR MANUAL WELDING

This invention relates to gas shielded arc torches and more particularly to a multielectrode arc torch for manual welding.

In the U.S. application of August F. Manz for "Consumable Electrode Arcless Electric Welding," Ser. No. 170,875, filed Feb. 5, 1962, now U.S. Pat. No. 3,122,629, there is disclosed a process for depositing metal on the surface of a workpiece by means of a continuous "arcless" short circuit between the work and a consumable electrode. The electrode is continuously melted at any desired rate by a process of $I^2R$ heating of the electrode extension. Such process may be advantageously combined in a conventional arc welding operation to increase metal deposition. However, this would normally require two independently operable torches which for manual welding is too impractical.

It is therefore the primary object of this invention to provide a manually operable torch adapted to be held in the hand of the operator which houses two electrodes capable of performing independent functions.

Another object of this invention is to provide a combined gas nozzle and auxiliary consumable electrode housing which is readily detachable from the main body of the torch.

A further object of this invention is to provide a flexible torch, one in which the gas nozzle is rotatable about its longitudinal axis to allow the welding operator to weld in positions which would otherwise be inconvenient and/or cumbersome.

A still further object of the present invention is to provide a torch which houses both an auxiliary and main electrode wherein the position of the auxiliary electrode is selectively adjustable in a lateral direction with respect to the main electrode.

Another object of the present invention is to provide a manually operable torch housing for both a main and auxiliary electrode wherein the cooling fluid for the main electrode housing is recirculated to cool the nozzle and power line for the auxiliary electrode.

IN THE DRAWINGS:

FIG. 1 is a side elevation of the torch.

FIG. 2 is a vertical section shown partly in elevation taken along lines 2-2 of FIG. 1.

The torch indicated generally as T in FIG. 1 comprises a hollow current and gas supplying head H connected intermediate its ends to a shank S which is in turn connected to a handle D. A gas directing nozzle N is detachably connected to the torch head H by means of a lock nut L.

Passing through nozzle N is main electrode E and an auxiliary electrode 30. This is more clearly shown in FIG. 2. Main electrode E is a nonconsumable electrode, preferably formed of thoriated tungsten, which is positioned and maintained in axial alignment with the longitudinal axis of nozzle N by means of an electrode holder assembly 10. The electrode holder assembly 10 is of conventional design consisting of a collet body 12 and collet member 14. The lower end of collet member 14 is counterbored and slotted to form collet jaws adapted to firmly grip and hold main electrode E after the main electrode is slidably inserted therethrough. The collet member 14 is seated in the collet body 12 which in turn is connected at its upper end in a conventional manner (not shown) to the torch head H.

Collet body 12 is externally threaded intermediate its ends at 16 for engagement with an adapter 18. Adapter 18 serves as an intermediary member for connecting nozzle N to torch head H and coacts with lock nut L such that nozzle N may be rotated about its longitudinal axis in a manner to be hereinafter described. Lock nut L is seated on annular collar 20 of adapter 18 and is internally threaded at 22 to receive nozzle N. In assembling the components, lock nut L is seated on collar 20 of adapter 18 which in turn is threadably engaged to collet body 12. When the lock nut L in unscrewed, i.e., partially loosened with respect to nozzle N, the combined nozzle N and lock nut L will rotate as one unit about adapter 18. By tightening lock nut L so that substantially no clearance exists at the interface 24 between nozzle N and adapter 18, the nozzle N will be securely locked in position.

Adapter 18 is composed of insulating material to electrically insulate the collet body 12 from the nozzle N. Additional insulating material is shown at 26.

Auxiliary electrode 30 is a consumable electrode which may be fed from a spool (not shown) through guide conduit 32, then through contact tube 34 and into direct contact with the workpiece (not shown). Auxiliary electrode 30 serves only to deposit additional metal into the weld puddle created by the main electrode E by means of $I^2R$ heating of the electrode extension as taught in U.S. Pat. No. 3,122,269. The rate of feed and current flow must be correlated such that an "arcless" short circuit is always maintained between the tip of the auxiliary electrode 30 and the work.

Contact tip 34 through which auxiliary electrode 30 is fed is coaxially mounted in a cylindrical sleeve or socket 36 of nozzle N inclined at an acute angle to the axis of main electrode E. The upper end of contact tip 34 is externally threaded at 38 to engage a swivel joint assembly 40. Swivel joint assembly 40 includes a lower portion 42 in detachable engagement with contact tip 34 and a mated upper portion 44. Upper portion 44 is internally bored and configured at 48 to receive and support one end of guide conduit 32. Auxiliary electrode 30 passes through guide conduit 32. The lower portion 42 of swivel joint assembly 40 may be selectively rotated about the upper portion 44 at the mated junction 46 located between the upper and lower portions respectively.

A slight bend is formed in contact tip 34 near its open end at 48 to permit the welding operator to align the position of the tip of auxiliary electrode 30 with respect to the main electrode E. The auxiliary electrode 30 is reasonably flexible and will follow the curvature of its confines, namely that of contact tip 34 as it is being continuously fed toward the work. Since the contact tip is slightly bent and lies at an angle with the workpiece (not shown) the tip of the auxiliary electrode 30 will inscribe an ellipse for a complete revolution of the lower portion 42 of swivel joint assembly 40. Thus the lateral spacing between the tip of auxiliary electrode 30 and main electrode E is selectively adjustable by the welding operator.

The position of the auxiliary electrode 30 with respect to the main electrode E is important in that the electrodes must function independently of one another. Moreover, for maximum welding effectiveness, the auxiliary electrode 30 should be positioned behind the main electrode E in line with the chosen direction of travel and fed directly into the weld puddle formed by main electrode E. Should the auxiliary electrode 30 be positioned too close to main electrode E the two electrodes would interfere with one another and in fact the arc established between the main electrode and the work may transfer in part across to the auxiliary electrode causing burnoff and sparking. On the other hand, if the auxiliary electrode is spaced too far from the arc established by the main electrode, metal will be deposited in a solidified section of the weld puddle.

In order to insure proper operation the bend in contact tip 34 of torch T should be no greater than about 3° from its central axis. Moreover, the included angle between the longitudinal axis of sleeve 36 of nozzle N and the axis of the main electrode E should be in a range between 10—25° with 18° being preferred. The lateral spacing between the auxiliary electrode 30 and main electrode E can thereafter be adjusted by the welding operator to achieve optimum welding results by twisting the lower portion 42 of swivel joint assembly 40. A set screw (not shown) is mounted in an open boss member 50 shown in FIG. 1 for securing contact tip 34 into a relatively fixed position.

A barrel shaped extension 54 of nozzle N is adapted to receive one end of power cable 52. Extension 54 is axially bored for the greater part of its length into which cooling fluid is supplied via conduit 56, a section of which is shown in FIG.

1. The cooling fluid enters the torch via power cable 58 for cooling the torch head H in a conventional manner and is then recirculated via trombone section 60 through conduit 56 into the internally bored section of extension 54 and then passed out via power cable 52. Thus the cooling fluid used to cool torch head H is recirculated to cool nozzle N and the power cable 52 for auxiliary electrode 30. The nozzle N acts as the power carrier from the power cable 52 to the conductive contact tip 34 for supplying power to auxiliary electrode 30. Hence nozzle N must be composed either partly or entirely of conductive material or upon which a conductive inner layer is deposited to electrically join power cable 52 to contact tip 34. Adapter 18 as discussed heretofore insulates nozzle N from the main electrode holder assembly 10. Main electrode E receives power in a conventional manner through torch head H from a power source separate from that used to supply power to the auxiliary electrode.

Although this invention has been described with a certain degree of particularity, it is to be understood that the present disclosure permits numerous changes in the details of construction without departing from the spirit and scope of the invention as hereinafter claimed.

We claim:

1. An arc torch comprising a head, a main electrode mounted in said head, a gas nozzle surrounding said main electrode and connected to said head with said main electrode extending beyond the outlet end of the nozzle, an inclined socket connected to said nozzle and extending along and outside said nozzle, a contact tip mounted in said socket, said contact tip having a bend therein adjacent the outlet end of the nozzle, a bore extending through said contact tip through which an auxiliary electrode may be fed and means for rotating said bent contact tip within said socket such that the lateral spacing between said main electrode and the end of said bent contact tip adjacent the outlet end of the nozzle may be selectively adjusted.

2. An arc torch as defined in claim 1 wherein the longitudinal axis of said bore is at an angle in the range between 10J—25° with respect to the longitudinal axis of said main electrode.

3. An arc torch as defined in claim 2 wherein said means for rotating said bent contact tip comprises a swivel joint assembly mounted on said socket at the end thereof remote from the outlet end of the nozzle, said swivel joint assembly comprising an upper portion having an internal bore in coaxial relation with the bore of said contact tip for receiving the auxiliary electrode and a lower portion, said lower portion having one end in detachable engagement with said contact tip and another end thereof rotatably mounted on said upper portion whereby the contact tip may be rotated by turning the lower portion of the swivel assembly while the upper portion remains stationary.

4. An arc torch as defined in claim 1 further comprising an adapted connecting said gas nozzle to said head such that said nozzle is rotatable about its longitudinal axis.

5. An arc torch as defined in claim 4 wherein said adapter has a collar extending about its periphery and a lock nut seated on said collar, said adapter being detachably connected to said head, and said nozzle being detachably connected to said lock nut whereby when said lock nut is loosened said nozzle is rotatable.

6. An arc torch as defined in claim 1 wherein said nozzle is electrically conductive and wherein said torch further comprises means for recirculating a cooling fluid through said head and said nozzle such that said head and nozzle are series cooled by the same cooling fluid.

7. A gas shielded arc welding torch comprising in combination a torch head; a main electrode mounted in said head; a gas nozzle surrounding said main electrode with said main electrode extending beyond the outlet end of the nozzle; means for rotatably connecting said gas nozzle to said torch head including means for locking said nozzle in place, said nozzle having a socket inclined downwardly and inwardly from a location intermediate its ends to the outlet end of the nozzle; a contact tip mounted in said socket and having a bend at the end adjacent said outlet end; a bore extending through said contact tip; a swivel joint assembly mounted on said socket at the end thereof remote from the outlet end of the nozzle, said swivel joint assembly comprising: an upper portion having an internal bore coaxial with the bore of said contact tip through which an auxiliary electrode may be fed, and a lower portion, said lower portion having one end in detachable engagement with said contact tip and another end thereof rotatably mounted on said upper portion; and means for recirculating a cooling fluid through said torch head and said nozzle such that said torch head and nozzle are series cooled by the same cooling fluid.